(12) United States Patent
Sedarat et al.

(10) Patent No.: US 8,928,425 B1
(45) Date of Patent: Jan. 6, 2015

(54) COMMON MODE DETECTOR FOR A COMMUNICATION SYSTEM

(75) Inventors: Hossein Sedarat, San Jose, CA (US); Paul Langner, Fremont, CA (US); Ramin Farjadrad, Los Altos, CA (US); Ramin Shirani, Morgan Hill, CA (US)

(73) Assignee: Aquantia Corp., Milpitas, CA (US)

( * ) Notice: Subject to any disclaimer, the term of this patent is extended or adjusted under 35 U.S.C. 154(b) by 1302 days.

(21) Appl. No.: 12/604,323

(22) Filed: Oct. 22, 2009

Related U.S. Application Data

(63) Continuation of application No. 12/551,340, filed on Aug. 31, 2009, now abandoned.

(60) Provisional application No. 61/141,639, filed on Dec. 30, 2008, provisional application No. 61/141,640, filed on Dec. 30, 2008, provisional application No. 61/173,394, filed on Apr. 28, 2009, provisional application No. 61/099,979, filed on Sep. 25, 2008.

(51) Int. Cl.
*H03H 7/00* (2006.01)

(52) U.S. Cl.
USPC .......................................... 333/12; 333/177

(58) Field of Classification Search
USPC .................................................. 333/12, 177
See application file for complete search history.

(56) References Cited

U.S. PATENT DOCUMENTS

| | | |
|---|---|---|
| 3,506,906 A | 4/1970 | Nestor |
| 3,671,859 A | 6/1972 | Miller |
| 4,797,902 A | 1/1989 | Nishiguchi et al. |
| 4,870,370 A | 9/1989 | Hedberg et al. |
| 5,157,690 A | 10/1992 | Buttle |
| 5,283,811 A | 2/1994 | Chennakeshu et al. |
| 5,550,924 A | 8/1996 | Helf et al. |
| 5,777,692 A | 7/1998 | Ghosh |
| 5,832,032 A | 11/1998 | Overbury |
| 5,889,511 A | 3/1999 | Ong et al. |
| 5,910,960 A | 6/1999 | Claydon et al. |
| 5,995,566 A | 11/1999 | Rickard et al. |
| 5,995,567 A | 11/1999 | Cioffi et al. |
| 6,011,508 A | 1/2000 | Perreault et al. |

(Continued)

FOREIGN PATENT DOCUMENTS

| | | |
|---|---|---|
| WO | WO 97/40587 | 10/1997 |
| WO | WO2011/056970 A2 | 5/2011 |

OTHER PUBLICATIONS

U.S. Appl. No. 12/977,844, filed Dec. 23, 2010, Sedarat.
U.S. Appl. No. 12/563,938, filed Sep. 21, 2009, Sedarat.

(Continued)

*Primary Examiner* — Robert Pascal
*Assistant Examiner* — Kimberly Glenn
(74) *Attorney, Agent, or Firm* — Lance Kreisman; Peninsula Patent Group

(57) ABSTRACT

A circuit for a wireline system is disclosed. In an embodiment, the circuit includes a twisted pair channel. The twisted pair channel delivers a differential signal that includes a converter mode component. The circuit includes at least one transformer coupled to the twisted pair channel and a transceiver coupled to the at least one transformer. The circuit further includes a common mode detection coupled to the transceiver for detecting a common mode component. In an embodiment, the circuit detects the common mode component. Accordingly, with common mode component detection capability, the common mode component of the differential can be analyzed for characterization purposes as well as for potential improvement in the system performance signal.

24 Claims, 9 Drawing Sheets

(56) References Cited

U.S. PATENT DOCUMENTS

| | | |
|---|---|---|
| 6,035,360 A | 3/2000 | Doidge et al. |
| 6,052,420 A | 4/2000 | Yeap |
| 6,069,917 A | 5/2000 | Werner et al. |
| 6,285,718 B1 | 9/2001 | Reuven |
| 6,385,315 B1 | 5/2002 | Viadella et al. |
| 6,424,234 B1 | 7/2002 | Stevenson |
| 6,486,746 B1 | 11/2002 | Gilbert |
| 6,683,913 B1 | 1/2004 | Kantschuk |
| 6,690,739 B1 | 2/2004 | Mui |
| 6,711,207 B1 | 3/2004 | Amrany et al. |
| 6,734,659 B1 | 5/2004 | Fortner |
| 6,771,720 B1 | 8/2004 | Yang et al. |
| 6,924,724 B2 | 8/2005 | Grilo et al. |
| 6,934,345 B2 | 8/2005 | Chu et al. |
| 6,959,056 B2 | 10/2005 | Yeap et al. |
| 6,999,504 B1 | 2/2006 | Amrany et al. |
| 7,026,730 B1 | 4/2006 | Marshall et al. |
| 7,031,402 B2 | 4/2006 | Takada |
| 7,103,013 B1 | 9/2006 | Kim et al. |
| 7,123,117 B2 | 10/2006 | Chen et al. |
| 7,164,764 B2 | 1/2007 | Zimmerman et al. |
| 7,173,992 B2 | 2/2007 | Frigon |
| 7,180,940 B2 | 2/2007 | Li et al. |
| 7,200,180 B2 | 4/2007 | Verbin et al. |
| 7,315,592 B2 | 1/2008 | Tsatsanis et al. |
| 7,333,603 B1 | 2/2008 | Sallaway et al. |
| RE40,149 E | 3/2008 | Vitenberg |
| 7,440,892 B2 | 10/2008 | Tamura |
| 7,457,386 B1 | 11/2008 | Phanse |
| 7,459,982 B2 | 12/2008 | Miao |
| 7,492,840 B2 | 2/2009 | Chan |
| 7,522,928 B2 | 4/2009 | O'Mahony |
| 7,542,528 B1 | 6/2009 | Cheong |
| 7,634,032 B2 | 12/2009 | Chu et al. |
| 7,656,956 B2 | 2/2010 | King |
| 7,706,434 B1 | 4/2010 | Farjadrad |
| 7,708,595 B2 | 5/2010 | Chow et al. |
| 8,094,546 B2 | 1/2012 | Schenk |
| 8,139,602 B2 | 3/2012 | Meier |
| 8,331,508 B2 | 12/2012 | Dabiri |
| 8,472,532 B2 | 6/2013 | Schley-May et al. |
| 8,625,704 B1 | 1/2014 | Sedarat et al. |
| 2003/0186591 A1 | 10/2003 | Jensen et al. |
| 2003/0223488 A1 | 12/2003 | Li et al. |
| 2003/0223505 A1 | 12/2003 | Verbin et al. |
| 2004/0010203 A1 | 1/2004 | Bibian et al. |
| 2004/0023631 A1 | 2/2004 | Deutsch et al. |
| 2004/0164619 A1 | 8/2004 | Parker et al. |
| 2004/0213366 A1 | 10/2004 | Ono |
| 2004/0239465 A1 | 12/2004 | Chen et al. |
| 2004/0252755 A1 | 12/2004 | Jaffe et al. |
| 2004/0257743 A1 | 12/2004 | Chen et al. |
| 2005/0018777 A1 | 1/2005 | Azadet |
| 2005/0025266 A1 | 2/2005 | Chan |
| 2005/0053229 A1 | 3/2005 | Tsatsanis et al. |
| 2005/0097218 A1 | 5/2005 | Sultenfuss et al. |
| 2005/0123081 A1 | 6/2005 | Shirani |
| 2005/0135489 A1 | 6/2005 | Ho et al. |
| 2005/0203744 A1 | 9/2005 | Tamura |
| 2005/0243483 A1 | 11/2005 | Chen et al. |
| 2006/0018388 A1 | 1/2006 | Chan |
| 2006/0056503 A1* | 3/2006 | Keshab et al. ............... 375/233 |
| 2006/0159186 A1 | 7/2006 | King |
| 2006/0182014 A1 | 8/2006 | Lusky et al. |
| 2006/0256880 A1 | 11/2006 | Frisch |
| 2007/0014378 A1 | 1/2007 | Parhi et al. |
| 2007/0081475 A1 | 4/2007 | Telado et al. |
| 2007/0146011 A1 | 6/2007 | O'Mahony et al. |
| 2007/0192505 A1 | 8/2007 | Dalmia |
| 2007/0258517 A1 | 11/2007 | Rollings et al. |
| 2007/0280388 A1 | 12/2007 | Torre et al. |
| 2008/0089433 A1 | 4/2008 | Cho et al. |
| 2008/0095283 A1 | 4/2008 | Shoor et al. |
| 2008/0107167 A1 | 5/2008 | Tung et al. |
| 2008/0160915 A1 | 7/2008 | Sommer et al. |
| 2008/0198909 A1 | 8/2008 | Tsatsanis et al. |
| 2008/0267212 A1 | 10/2008 | Crawley et al. |
| 2009/0061808 A1 | 3/2009 | Higgins |
| 2009/0097401 A1 | 4/2009 | Diab |
| 2009/0097539 A1 | 4/2009 | Furman et al. |
| 2009/0154455 A1 | 6/2009 | Diab |
| 2009/0161781 A1 | 6/2009 | Kolze |
| 2010/0046543 A1 | 2/2010 | Parnaby |
| 2010/0073072 A1 | 3/2010 | Ullen et al. |
| 2010/0074310 A1 | 3/2010 | Roo et al. |
| 2010/0086019 A1 | 4/2010 | Agazzi et al. |
| 2010/0111202 A1 | 5/2010 | Schley-May et al. |
| 2010/0159866 A1 | 6/2010 | Fudge et al. |
| 2011/0032048 A1 | 2/2011 | Wu et al. |
| 2011/0069794 A1 | 3/2011 | Tavassoli Kilani et al. |
| 2011/0106459 A1 | 5/2011 | Christ et al. |
| 2011/0212692 A1 | 9/2011 | Hahn |
| 2011/0256857 A1 | 10/2011 | Chen et al. |
| 2011/0293041 A1 | 12/2011 | Luo et al. |
| 2011/0296267 A1 | 12/2011 | Malkin et al. |

OTHER PUBLICATIONS

U.S. Appl. No. 12/604,343, filed Oct. 22, 2009, Farjadrad et al.
U.S. Appl. No. 12/604,351, filed Oct. 22, 2009, Sedarat et al.
U.S. Appl. No. 12/604,358, filed Oct. 22, 2009, Sedarat et al.

* cited by examiner

COMMON MODE DETECTOR FOR A COMMUNICATION SYSTEM

CROSS REFERENCE TO RELATED APPLICATIONS

This application is a continuation of U.S. patent application Ser. No. 12/551,340, filed Aug. 31, 2009, which claims the benefit of U.S. Provisional Application No. 61/099,979, filed Sep. 25, 2008, entitled, "Interference Cancellation In 10gbase-T And Other Multi Channel Communication Systems," which are incorporated herein by reference in their entireties.

This application claims the benefit of:

U.S. Provisional Application No. 61/141,640, filed Dec. 30, 2008, entitled, "Methods and Apparatus to Detect Common Mode Signal in Wireline Communication Systems";

U.S. Provisional Application No. 61/141,639, filed Dec. 30, 2008, entitled, "Methods and Apparatus to Detect Common Mode Signal in Wireline Communication Systems";

U.S. Provisional Application No. 61/173,394, filed Apr. 28, 2009, entitled, "Integrated Common-Mode Transformer for Detection of Electromagnetic Interference on the Channel";

all of which are incorporated herein by reference in their entireties.

This application is related to:

U.S. patent application Ser. No. 12/604,351, entitled, Rejecting RF Interference in Communication Systems," filed concurrently herewith and assigned to the assignee of the present invention;

U.S. patent application Ser. No. 12/604,358, entitled, Fast Retraining for Transceivers in Communication Systems," filed concurrently herewith and assigned to the assignee of the present invention;

U.S. patent application Ser. No. 12/604,343, entitled, A Magnetic Package for a Communication System," filed concurrently herewith and assigned to the assignee of the present invention;

U.S. patent application Ser. No. 12/551,210, entitled, "Rejecting RF Interference in Communication Systems," filed concurrently herewith and assigned to the assignee of the present invention;

U.S. Provisional Application No. 61/153,440, filed Feb. 18, 2009, entitled, "Methods of Rejecting RF Interference in 10GBase-T Communication Systems";

U.S. patent application Ser. No. 12/551,347, entitled, "Fast Retraining for Transceivers in Communication Systems," filed concurrently herewith and assigned to the assignee of the present invention;

U.S. Provisional Application No. 61/148,112, filed Jan. 29, 2009, entitled, "Fast Retrain to In Decision-Directed Communication Systems";

U.S. patent application Ser. No. 12/563,938, entitled, "Cancellation of Alien Interference in Communication Systems," filed Sep. 21, 2009 and assigned to the assignee of the present invention;

U.S. patent application Ser. No. 12/551,396, entitled, "Cancellation of Alien Interference in Communication Systems," filed concurrently herewith and assigned to the assignee of the present invention;

U.S. patent application Ser. No. 12/551,326, entitled, "A Magnetic Package for a Communication System," filed concurrently herewith and assigned to the assignee of the present invention;

all of which are incorporated herein by reference in their entireties.

FIELD OF THE INVENTION

The present invention relates generally to communication systems and more specifically to a common mode circuit for a communication system.

BACKGROUND OF THE INVENTION

In wireline communication systems, the data is encoded on a modulated signal which is typically transmitted differentially over a pair of wires. In such systems, the common component of the differential signal on the two wires does not carry any information and it is typically noise from electromagnetic interference (EMI) and crosstalk. Examples of wireline communication systems that are susceptible to common mode noise include various flavors of Digital Subscriber Line (DSL) and Ethernet over copper. In these systems the communication medium typically consists of multiple cascaded sections of twisted pair of wires typically terminated with transformers at both ends.

FIG. 1 shows a circuit 100 that includes a termination of a twisted pair of wires 110 into a transformer 130. The transformer 130 is coupled to a transceiver 140 and is primarily used for DC isolation and common mode rejection. FIG. 1 also shows a common mode choke 120 which is sometimes included to further block the common mode signal. It also provides proper impedance termination for common mode signal which prevents reflections and standing waves.

In a perfect system, the common mode component is very well balanced and does not convert to a differential signal. However, in any practical system the transversal conversion loss (TCL) is finite which means some portion of the common mode signal shows up as differential noise at the receiver. The imbalance that would cause a finite TCL can be anywhere in the signal path including the wireline channel, the connectors at both end of the channel, and even the components that is used to detect the differential signal. This noise may be a limiting factor in the performance of a wireline communication system. Therefore, it is important to be able to detect the common mode component for characterization purposes as well as potential improvement in the performance. The present invention addresses such a need.

SUMMARY OF THE INVENTION

A circuit for a wireline system is disclosed. In an embodiment, the circuit includes a twisted pair channel. The twisted pair channel delivers a differential signal that includes a converter mode component. The circuit includes at least one transformer coupled to the twisted pair channel and a transceiver coupled to the at least one transformer. The circuit further includes a common mode detection coupled to the transceiver for detecting a common mode component. In an embodiment, the circuit detects the common mode component. Accordingly, with common mode component detection capability, the common mode component of the differential can be analyzed for characterization purposes as well as for potential improvement in the system performance signal.

Other aspects and advantages of the present invention will become apparent from the following detailed description, taken in conjunction with the accompanying drawings, illustrating by way of example the principles of the invention.

DETAILED DESCRIPTION

The present invention relates generally to communication systems and more specifically to a common mode circuit for a communication system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A circuit for a wireline system is disclosed. In an embodiment, the circuit includes a twisted pair channel. The twisted pair channel delivers a differential signal that includes a converter mode component. The circuit includes at least one transformer coupled to the twisted pair channel and a transceiver coupled to the at least one transformer. The circuit further includes a common mode detection coupled to the transceiver for detecting a common mode component. In an embodiment, the circuit detects the common mode component. Accordingly, with common mode component detection capability, the common mode component of the differential can be analyzed for characterization purposes as well as for potential improvement in the system performance signal.

Other aspects and advantages of the present invention will become apparent from the following detailed description, taken in conjunction with the accompanying drawings, illustrating by way of example the principles of the invention.

Figure 2:
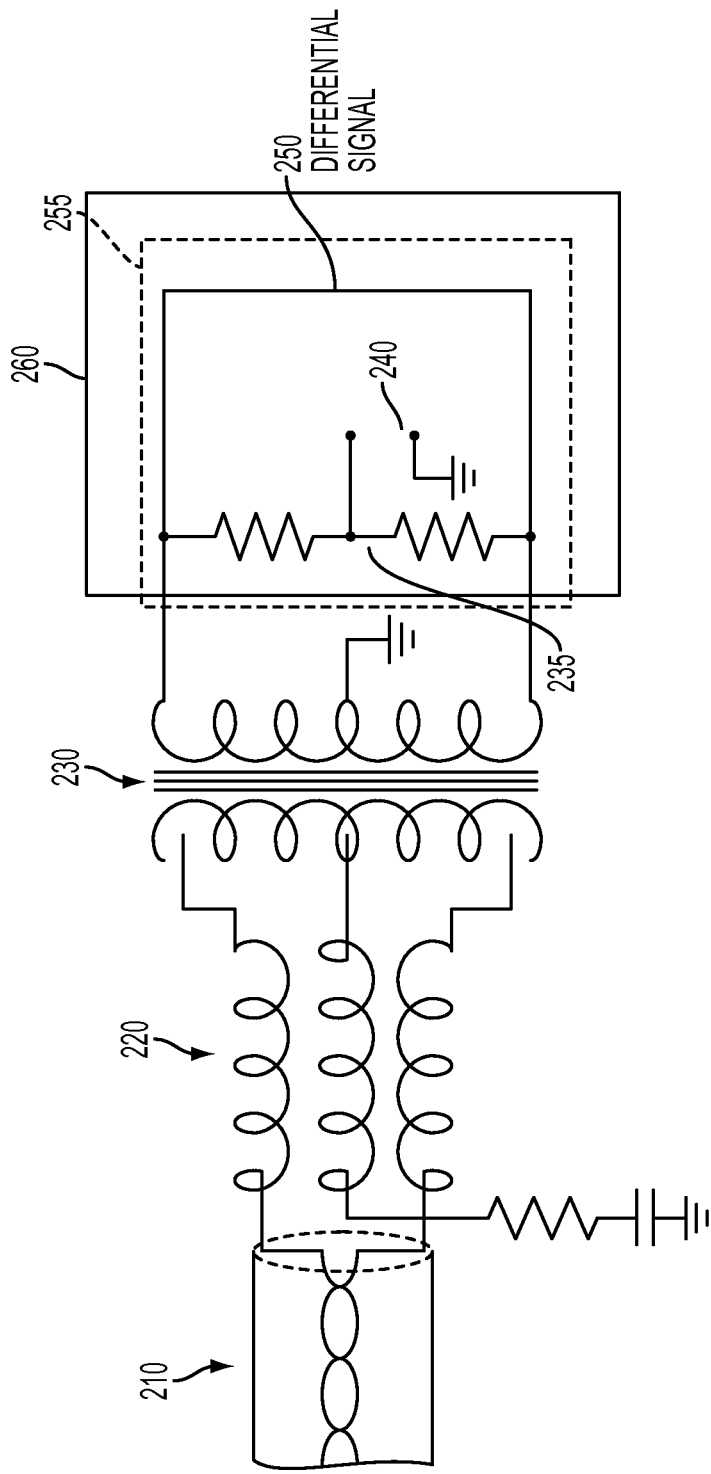
FIG. 2 shows a common mode circuit in accordance with an embodiment of the present invention.

There are a number of ways to sense and measure the common mode component in a transceiver. FIG. 2 shows a circuit 200 in accordance to an embodiment of the present invention. The circuit 200 includes a twisted pair channel 210, a common mode choke 220, a differential transformer 230 and a transceiver 260. The common mode choke 220 is coupled to the twisted pair channel 210 and the differential transformer 230. The differential transformer 230 is coupled to the transceiver 260 via a common mode controller 255.

The twisted pair channel 210 is a form of wiring in which two conductors (the forward and return conductors of a single circuit) are twisted together for the purpose of canceling out electromagnetic interference (EMI) from external sources, for instance, electromagnetic radiation from Unshielded Twisted Pair (UTP) cables, and crosstalk between neighboring pairs.

The common mode detector 255 is shown in the transceiver 260. Here, the common mode component 240 of a differential signal that has leaked into the transceiver 260 is extracted from the differential pair 250. A way to extract the common mode component 240 from a differential pair 250 is to tap the center point of impedance 235 that connects between the pair as shown in FIG. 2. Furthermore, in order to reduce the number of pins going to the chip, the center point of impedance 235 is placed inside of the transceiver 260.

Figure 3:
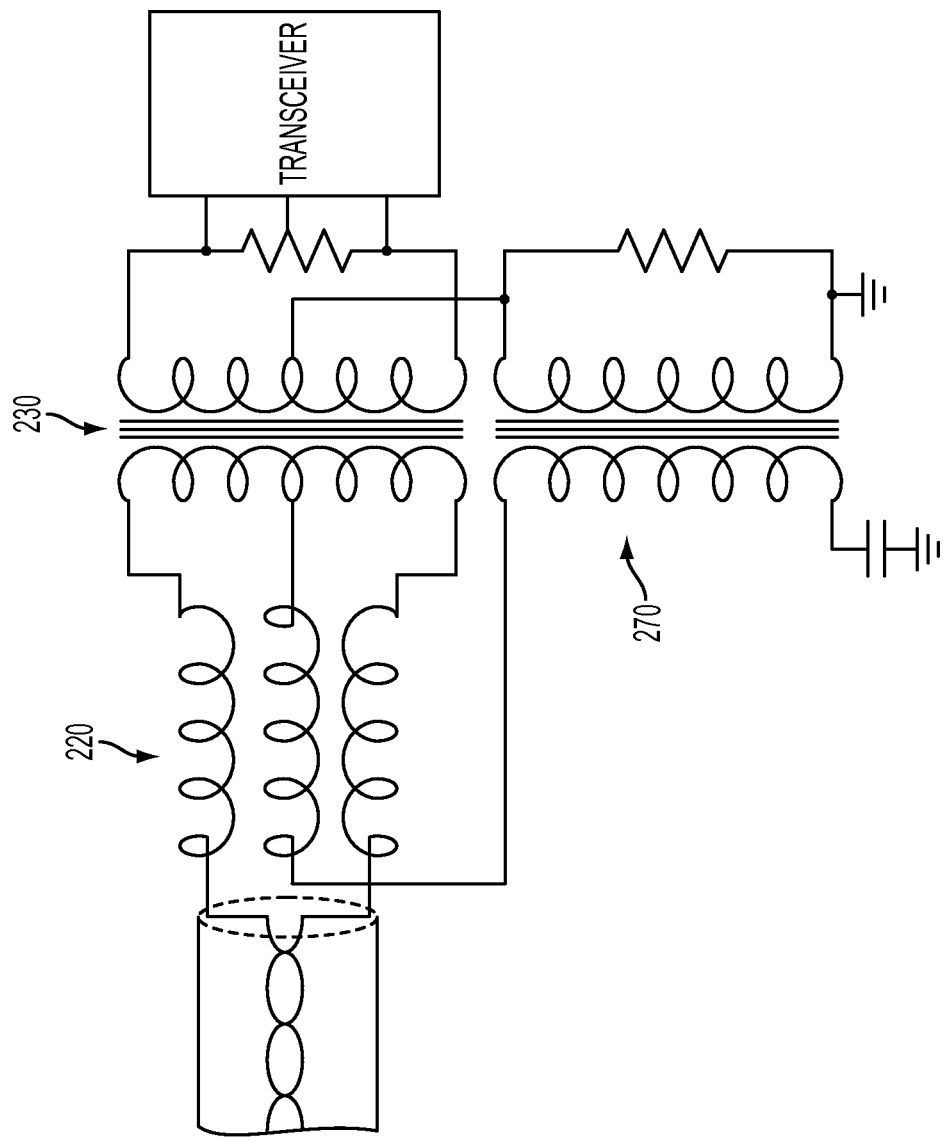
FIG. 3 shown an alternate embodiment of the common mode circuit in accordance with an embodiment of the present invention.

Since the common mode to common mode gain of various components may be independent and different of the common mode to differential gain, there may be a significant common mode component converted to differential signal on the differential pair while the common mode component on the differential pair 250 is negligible. In such cases, the common mode component to noise ratio may not be adequate for proper detection through a circuit similar to what shown in FIG. 2. Accordingly, FIG. 3 illustrates a way to provide a path to inject the common mode component 240 to the transceiver 260. FIG. 3 shows a common mode transformer 270 coupled to the differential transformer 230 and the common mode choke 220 for injecting the common mode component into the differential pair in order to facilitate proper detection.

Figure 4:
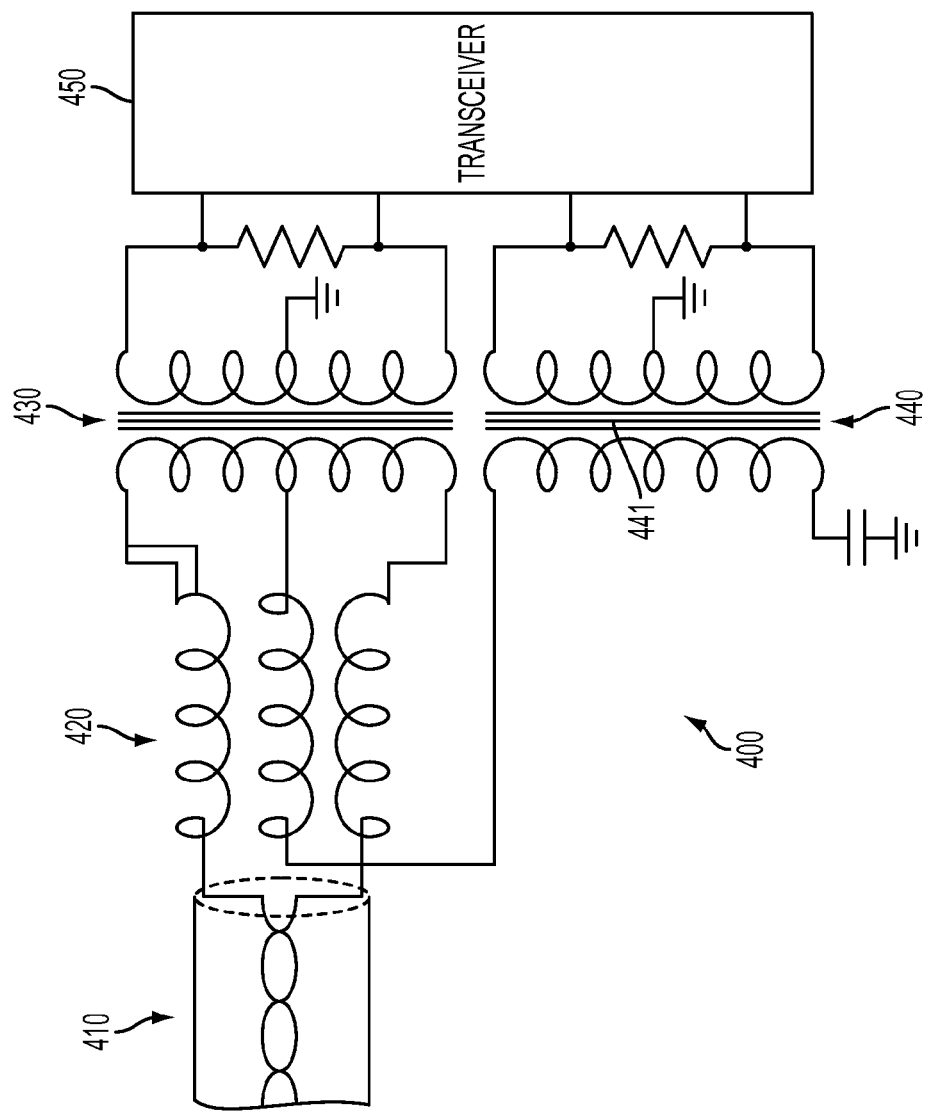
FIG. 4 shows a common mode detection circuit in accordance with an alternate embodiment of the present invention.

Alternatively, FIG. 4 shows a common mode detection circuit 400 in accordance with an alternate embodiment of the present invention whereby a transformer configuration is introduced which provides a means of common mode measurement. The circuit 400 includes a twisted pair channel 410, a common mode choke 420, a differential transformer 430, a common mode transformer 440, and a transceiver 450. The common mode choke 420 is coupled to the twisted pair channel 410 and the differential transformer 430. The differential transformer 430 is coupled to the common mode transformer 440 and the transceiver 450 whereby the common mode transformer 440 is coupled to the transceiver 450. Here the common mode transformer 440 provides for the detection and measurement of the common mode component.

Figure 1:
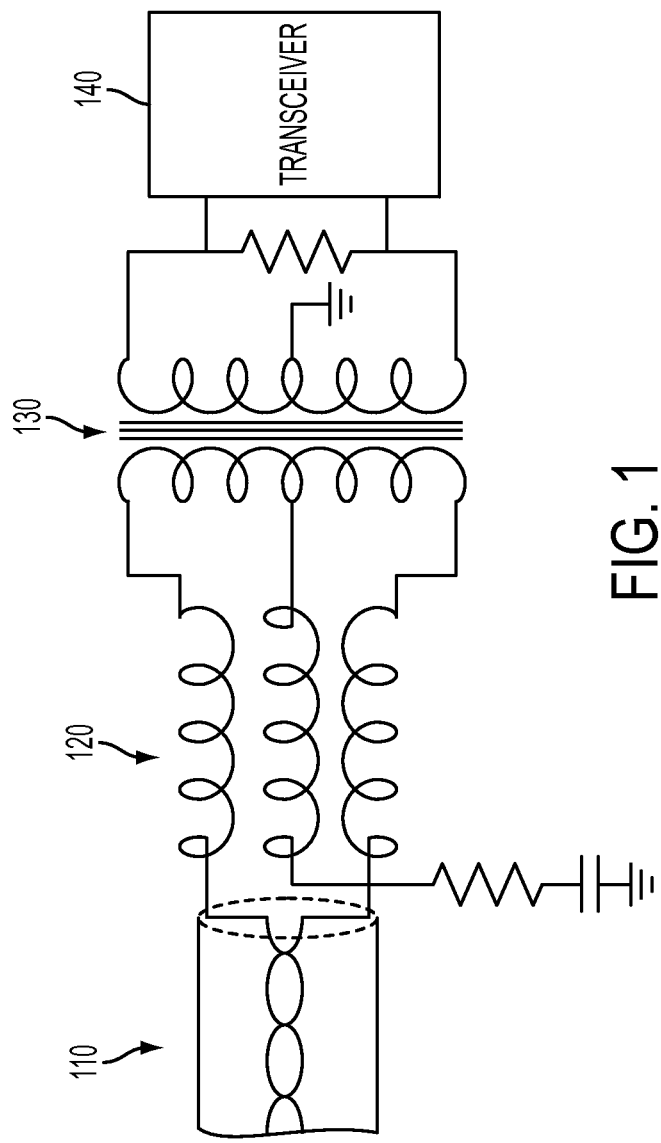
FIG. 1 shows such a termination of a twisted pair into a transformer.

An important consideration with regards to FIG. 4 is the electro-static discharge (ESD) or cable discharge event (CDE). ESD or CDE events result in large common mode voltages in a medium. In the typical case of FIG. 1, the transceiver 140 is isolated from the large common mode voltage on the cable as the transformer 130 rejects most of the common mode component while passing all the differential-mode signal. However, in FIG. 4, the common mode component of the cable side is effectively passed to the transceiver 450, thus becoming vulnerable to ESD/CDE events. To remedy this problem, the common mode transformer 440 is selected such that its core 441 saturates in the presence of large input voltages, basically having a clipping effect, to protect against over voltage. A large input voltage due to electro-static charge accumulated on the cable can reach or exceed few kV (e.g. 2000V).

The addition of this common mode transformer 440 as a discrete component can add a challenge for high density and/or price sensitive systems, making this solution not very attractive from practical implementation and production point of view. A solution to this problem is to integrate this transformer as an additional core to the package of the existing link transformer. In one solution, an existing package will have three additional pins per common mode transformer, two for differential connection of wires and one for center tap of transformer for proper biasing, thereby resulting in some increase in the size of the package with minimal impact on board layout and price.

Figure 6A:
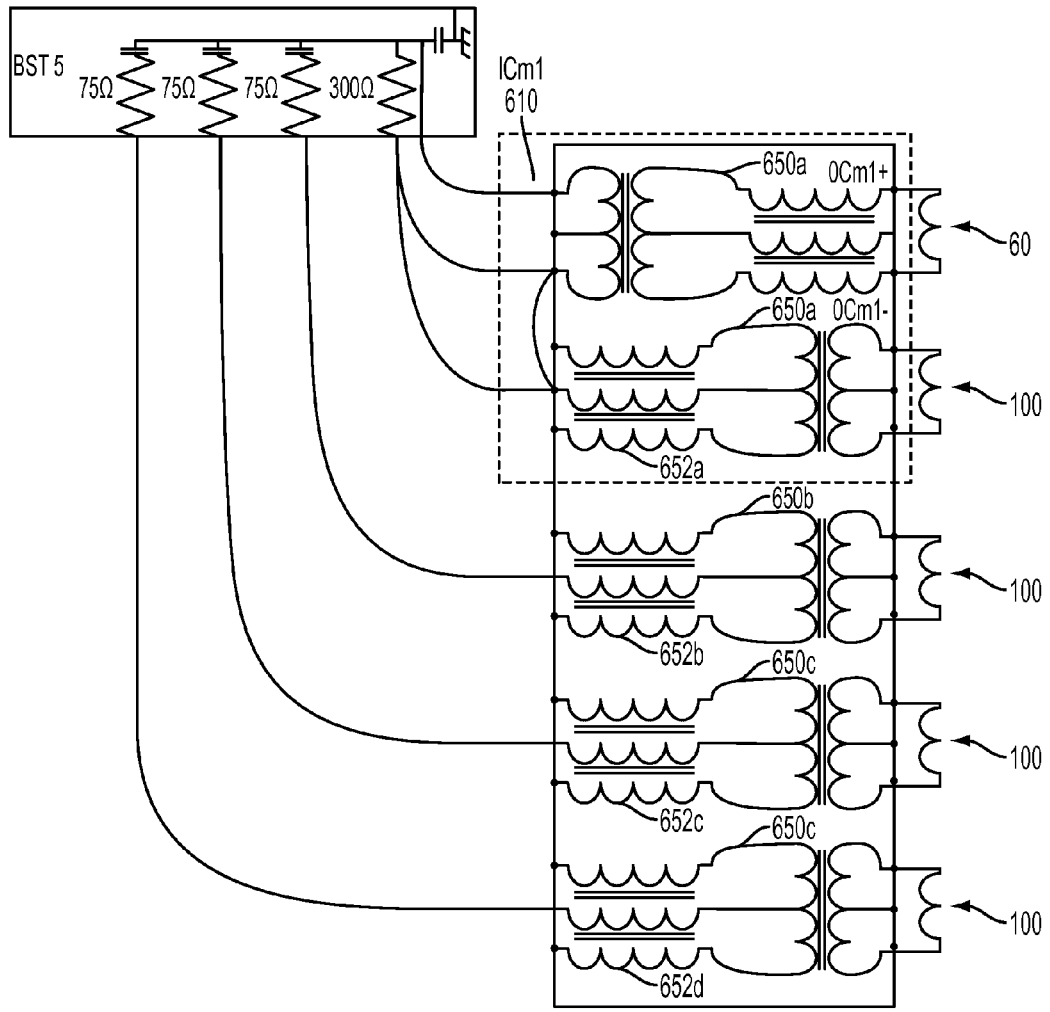
FIG. 6A illustrates a schematic view of a magnetic package with one integrated common mode transformer.

FIG. 6A illustrates a schematic view of a magnetic package with an integrated common mode transformer. For example, in the case of 10GBASE-T, where there are four pairs and thus four cores that include transformers 650a-650d and four cores that include chokes 652a-652d, a total of 8 cores, only one core for the common mode transformer 660 is used to detect the line common mode. This only increases the total size and price of the new component by factor of 9/8 only ~12%. However, there may be requirements for redundancy of this common mode core, which may lead to having 2 such cores and sensing common mode of two of the twisted pairs. In that case, an increase factor of 10/8 or 25% is contemplated.

Figure 5:
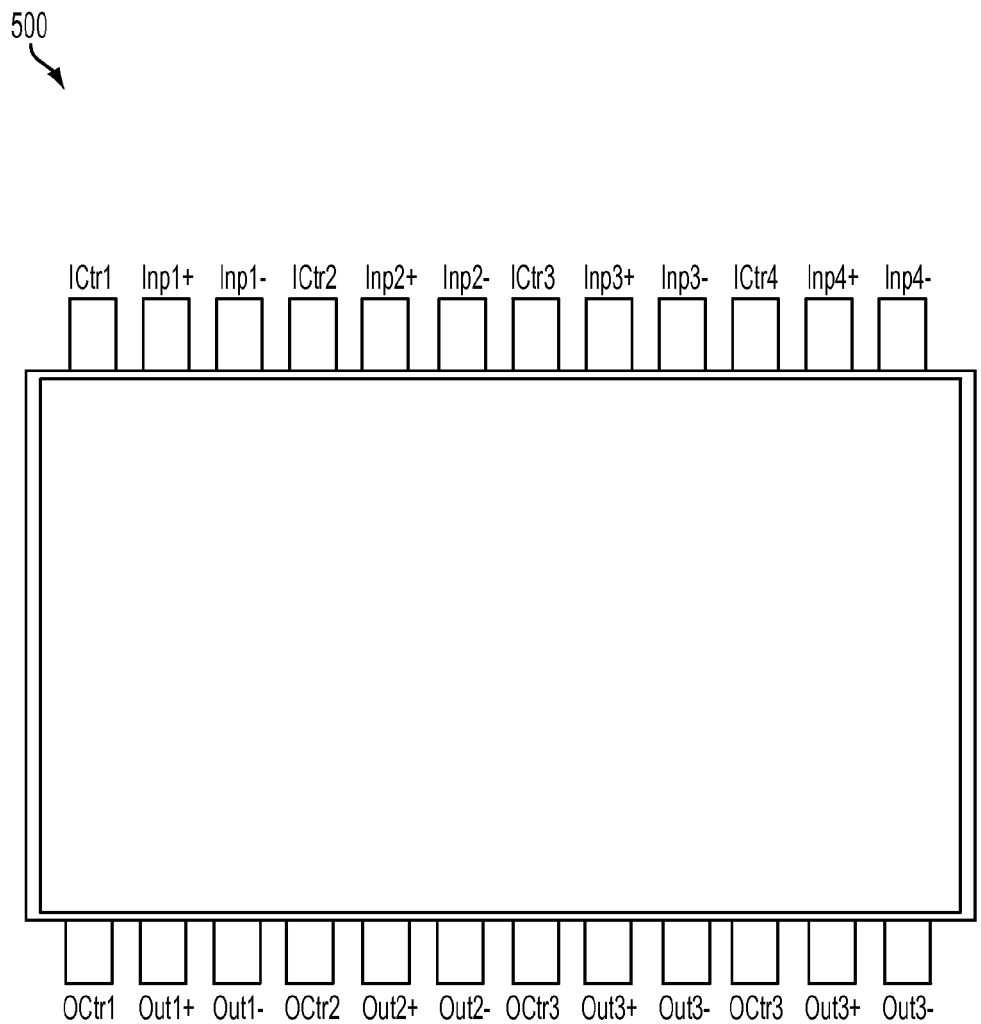
FIG. 5 shows an Ethernet BASE-T (e.g. 10GBASE-T) magnetic package.
Figure 6B:
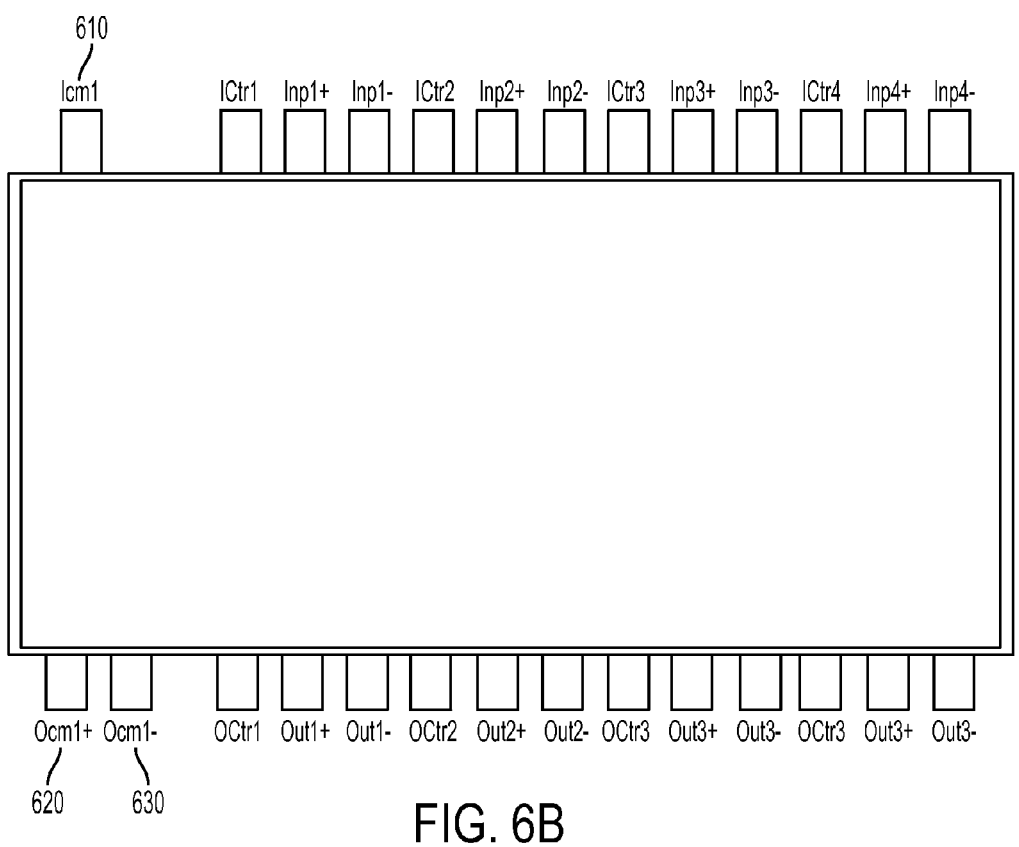
FIG. 6B illustrates a magnetic package with an integrated common mode transformer.
Figure 7:
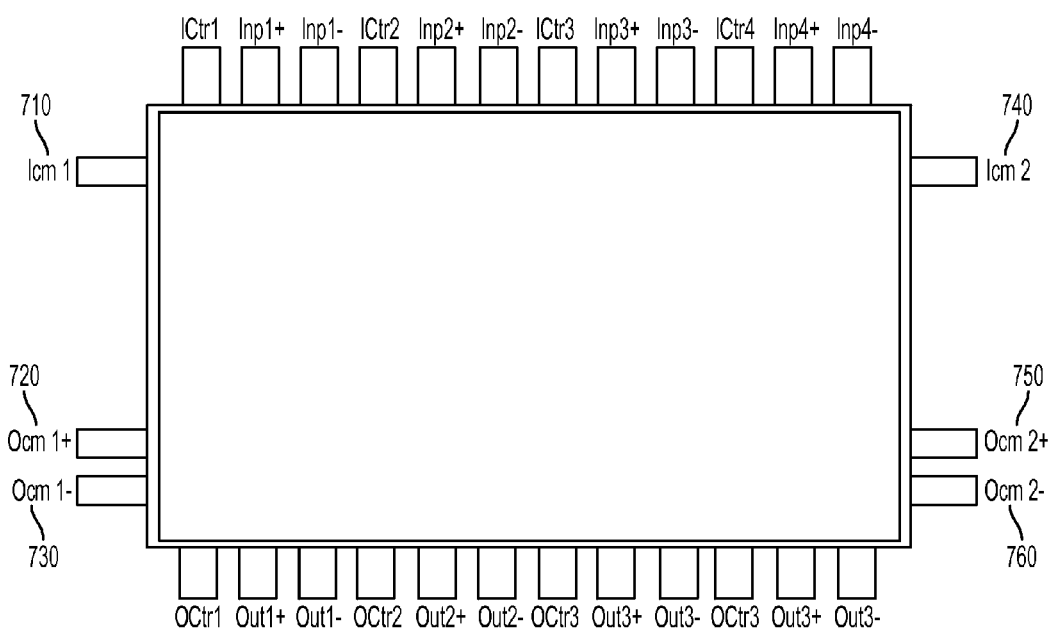
FIG. 7 illustrates a BASE-T magnetic package with two integrated common mode transformers.

FIG. 5 shows an example of an Ethernet BASE-T (e.g. 10GBASE-T) magnetic package 500. Each input and output per pair has three pins, two for differential connection of wires and one for center tap of transformer for proper biasing. For the case of a transformer having one additional common mode transformer, the extra pins (Icm1, Ocm1+, Ocm1−) can be placed on the top and bottom of the package together with the rest of the pins. This can be seen in FIG. 6B which shows the extra pins Icm1 610, Ocm1+ 620 and Ocm1− 630. Of course the extra pins 610, 620, 630 can be placed anywhere on the top and bottom. However, to avoid increasing the package size for extra pins, the additional pins can be placed on the sides, as shown in FIG. 7. FIG. 7 shows the additional pins Icm1 710, Ocm1+ 720, Ocm1− 730 and Icm2 740, Ocm2+ 750, Ocm2− 760 on the sides.

Figure 8:
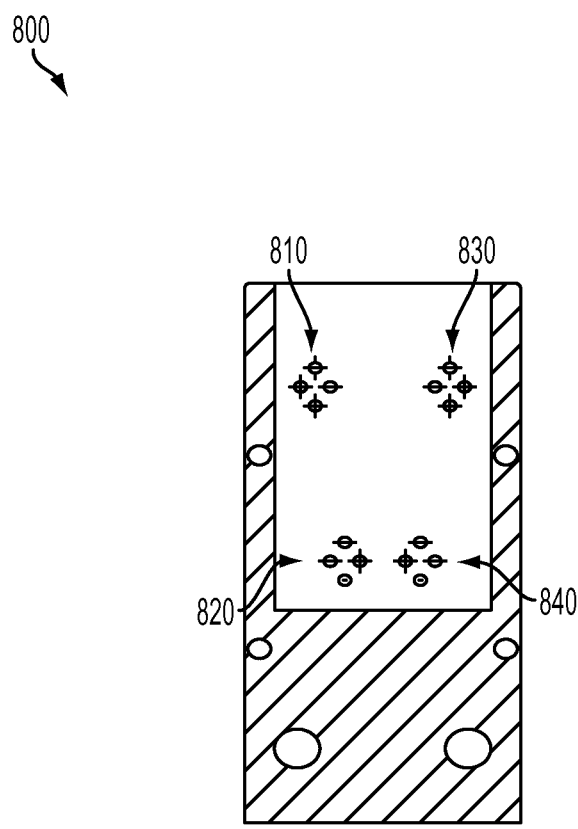
FIG. 8 illustrates a bottom view of a BASE-T ICM package with four groups of pins.

This concept can be applied to Integrated Connector Modules (ICM) that combine a transformer and a connector. In fact the integration of the common mode transformers in the ICM is desirable as the center tap of the transformer in the cable side that carries the common mode component does not come out as a pin in the ICMs and are terminated inside the package. In the case of ICM, signal pins connected to the board are preferably all underneath the package. This is shown in FIG. 8 as the four groups of pins 810, 820, 830, 840 are shown in the bottom view of an ICM 800. It should be noted that two pins of the four pins in the sub groups are differential signals and two are center taps of the same channel. Accordingly, the fifth channel for the common mode transformer output can be placed at the center of the four groups, as an example, and no input will be visible for the common mode transformer in this case.

Referring back to FIG. 4, it should also be mentioned that the center-tap termination for the common mode can be eliminated for the case of having a common mode transformer 440 connected to that center tap, if the other side of the transformer 440 is going to be terminated. Assuming that in most scenarios the center tap termination is different from 50 ohms and in most cases it is easier to have a 50 ohm termination, the transformer primary/secondary ratios can be adjusted to convert 50 ohms to any target value. Consequently, the addition of the common mode transformer 440 does not result in additional board components either.

Additionally, it is envisioned that an implementation of the present invention includes a method of providing for a common mode detection circuit. The method comprises providing for a twisted pair channel, providing for a common mode choke coupled to the twisted pair channel, providing for at least one transformer coupled to the common mode choke, providing for a transceiver coupled to the at least one transformer and providing for a common mode component controller coupled to the at least one transformer and the transceiver.

Varying embodiments of the present invention define a unique common mode detection circuit for a communication system. In an embodiment, the circuit detects the common mode component. Accordingly, with common mode signal detection capability, the common mode component can be analyzed for characterization purposes as well as for potential improvement in the system performance.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An ethernet circuit comprising:
a differential transformer having at least two conductors for coupling to a differential twisted pair channel, the channel to propagate an ethernet differential signal having a common mode component;
wherein the differential transformer includes a differential pair of conductors for coupling to a 10GBASE-T transceiver;
common-mode detection circuitry to detect the common-mode component, the common-mode detection circuitry including common-mode termination circuitry; and
wherein the Ethernet circuit is embodied as a 10GBASE-T ethernet circuit.

2. The ethernet circuit according to claim 1 further comprising:
the transceiver coupled to the differential transformer; and
wherein the common-mode detection circuitry is disposed internal to the transceiver.

3. The ethernet circuit according to claim 1 further comprising:
the transceiver coupled to the differential transformer; and
wherein the common-mode detection circuitry is disposed external to the transceiver.

4. The ethernet circuit according to claim 1 wherein the common-mode detection circuitry comprises:
an impedance having a center-point and shunting the differential pair of conductors; and
a tap coupled to the impedance center-point.

5. The ethernet circuit according to claim 1 and further comprising:
a common-mode choke.

6. The ethernet circuit according to claim 5 wherein the differential transformer includes a center-tap, and the common-mode choke includes:
a third conductor coupled to the differential transformer center-tap.

7. The ethernet circuit according to claim 6 and further including:
a common-mode transformer having a primary winding coupled to the third conductor, and a secondary winding for coupling to the transceiver.

8. The ethernet circuit according to claim 7 wherein:
the secondary winding couples to the differential transformer center-tap.

9. The ethernet circuit according to claim 8 wherein:
the secondary winding includes a pair of conductors, and an impedance shunting the pair of conductors, wherein the pair of conductors is for coupling to the transceiver and includes a common-mode tap conductor coupled to the shunt impedance.

10. The ethernet circuit according to claim 8 wherein:
the common-mode secondary winding includes a pair of conductors and an impedance shunting the pair of conductors, the pair of conductors for coupling to the transceiver.

11. The ethernet circuit according to claim 6 wherein:
the common-mode transformer includes a voltage clipping core.

12. The ethernet circuit according to claim 1 wherein the common-mode detection circuit includes an output impedance, and the common-mode termination circuit comprises a termination impedance coupled to the common-mode detection circuit and wherein a value of the termination impedance is based on the output impedance of the common-mode detection circuit.

13. The ethernet circuit according to claim 12 wherein the differential transformer comprises a common-mode tap and includes a second output impedance, and wherein the common-mode detection circuit couples to the common-mode tap.

14. The ethernet circuit according to claim 12 wherein the termination impedance matches a parallel output impedance formed by the second output impedance and the common-mode detection circuit output impedance.

15. The ethernet circuit according to claim 1 wherein the differential transformer comprises a plurality of differential transformers corresponding to multiple physical channels, and wherein the common-mode termination circuitry includes a common-mode termination impedance for each of the plurality of differential transformers.

16. An ethernet circuit comprising:
a differential transformer having at least two conductors for coupling to a differential twisted pair channel, the channel to propagate an ethernet differential signal having a common mode component;
wherein the differential transformer includes a differential pair of conductors for coupling to a transceiver; and
common-mode detection circuitry to detect the common-mode component, the common-mode detection circuitry including common-mode termination circuitry, wherein the common-mode termination circuitry comprises a Bob Smith Termination (BST).

17. A method of signaling along a twisted pair channel, the method comprising:
receiving a 10GBASE-T ethernet differential signal, the ethernet differential signal having a common-mode component;
detecting the common-mode component with a common-mode detection circuit; and
terminating the common-mode detection circuit with a Bob Smith Termination (BST).

18. A method according to claim 17 wherein:
the detecting occurs internal to a transceiver.

19. The method according to claim 17 wherein:
the detecting occurs external to a transceiver.

20. The method according to claim 17 and further including:
suppressing the common-mode component with a common-mode choke.

21. The method according to claim 20 and further including:
tapping the common-mode component from the common-mode choke;
transforming the tapped common-mode component into a transformed differential signal; and
injecting the tapped common-mode component into the transformed differential signal.

22. The method according to claim 20 and further including:
tapping the common-mode component from the common-mode choke;
transforming the tapped common-mode component; and
feeding the tapped common-mode component to a transceiver via transceiver pins.

23. An ethernet signaling system comprising:
a twisted pair of conductors defining a channel, the channel having a transmit end and a receive end;
a first differential transceiver circuit coupled to the transmit end to transmit an ethernet differential signal along the channel, the ethernet differential signal including a common-mode component;
a differential transformer coupled to the channel;
a second differential transceiver circuit coupled to differential transformer and the receive end of the channel, the second differential transceiver circuit comprising an integrated circuit chip transceiver; and
common-mode detection circuitry to detect the common-mode component, wherein the common-mode detection circuitry resides external to the integrated circuit chip transceiver and includes common-mode termination circuitry.

24. The ethernet signaling system according to claim 23 wherein:
the common-mode detection circuitry includes a common-mode choke coupled to the channel and the differential transformer, the common-mode choke including a center-tap; and
a common-mode transformer having a primary winding coupled to the center-tap.

* * * * *